(12) United States Patent
Narahara et al.

(10) Patent No.: US 10,442,466 B2
(45) Date of Patent: Oct. 15, 2019

(54) FRAME STRUCTURE OF VEHICLE

(71) Applicant: MAZDA MOTOR CORPORATION, Aki-gun, Hiroshima (JP)

(72) Inventors: Takashi Narahara, Hiroshima (JP); Takahiro Aonuma, Hiroshima (JP); Kazuto Ishii, Hiroshima (JP); Hiroto Kido, Hiroshima (JP); Takehito Kobayashi, Hiroshima (JP); Ken Fujimoto, Hiroshima (JP); Taiga Kamikawaji, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/760,621

(22) PCT Filed: Jan. 18, 2017

(86) PCT No.: PCT/JP2017/001513
§ 371 (c)(1),
(2) Date: Mar. 15, 2018

(87) PCT Pub. No.: WO2017/135032
PCT Pub. Date: Aug. 10, 2017

(65) Prior Publication Data
US 2018/0251158 A1  Sep. 6, 2018

(30) Foreign Application Priority Data

Feb. 4, 2016 (JP) ................................ 2016-019508

(51) Int. Cl.
*B62D 21/15* (2006.01)
*B62D 25/08* (2006.01)
*B62D 27/02* (2006.01)

(52) U.S. Cl.
CPC ......... *B62D 21/152* (2013.01); *B62D 25/082* (2013.01); *B62D 27/023* (2013.01)

(58) Field of Classification Search
CPC ... B62D 21/152; B62D 25/082; B62D 27/023
(Continued)

(56) References Cited

U.S. PATENT DOCUMENTS 7,407,192 B2 *  8/2008  Yoshimura ........... B62D 21/155
                                                280/124.109
8,480,102 B2 *  7/2013  Yamada ............... B62D 21/155
                                                180/311

FOREIGN PATENT DOCUMENTS

JP          2011088597 A       5/2011

* cited by examiner

*Primary Examiner* — Joseph D. Pape
(74) *Attorney, Agent, or Firm* — Alleman Hall Creasman & Tuttle LLP (57) ABSTRACT

Provided is a frame structure of a vehicle comprising a front side frame; a reinforcing member disposed in a closed cross section; and an inner bead portion which is formed from a plurality of ridgelines extending vertically on a side wall of the front side frame and projects inwardly into the closed cross section, in which the side wall has the front inclined planar portion which includes a line connecting the upper end portion of the intermediate ridgeline with the middle portion of the front ridgeline; and the rear inclined planar portion which includes a line connecting the upper end portion of the intermediate ridgeline with the middle portion of the rear ridgeline, and the reinforcing member is joined to the front proximal portion and the rear proximal portion of the intermediate ridgeline, which are the front and rear inclined planar portions.

5 Claims, 7 Drawing Sheets

(58) Field of Classification Search
USPC .......................... 296/187.09, 187.1, 203.02
See application file for complete search history.

FRAME STRUCTURE OF VEHICLE

TECHNICAL FIELD

The present invention relates to a frame structure of a vehicle, and particularly to a frame structure of a vehicle comprising a reinforcing member disposed in a closed cross section and a bead portion which projects inwardly into the closed cross section.

BACKGROUND ART

Conventionally, a pair of right-and-left front side frames provided on a front vehicle body of a vehicle are connected to the front side of a dash panel, each rear end part thereof extending near the front end of a floor panel rearwardly along a slant portion of the dash panel and joined to the dash panel and the floor panel from the outside of a vehicle room. In order to decrease a collision load against passengers in a vehicle frontal collision, a midway portion of the front side frame bends in a vehicle width direction at the front of the dash panel, and such deformation of the front side frame thus absorbs a collision energy of the collision load.

A front vehicle body structure of a vehicle disclosed in Japanese Patent Laid-Open Publication No. 2011-088597 comprises a front side frame which forms a closed cross section extending in a vehicle longitudinal direction; and a reinforcing member which reinforces an inward side wall of the front side frame, in which a pair of front and rear outer beads extending vertically are provided at an outward side wall of the front side frame so as to project into the closed cross section, an inner bead extending vertically is provided at the inward side wall of the front side frame at a position corresponding to a middle position between the pair of outer beads so as to project into the closed cross section, and each of the beads are formed in a zigzag manner in a plan view.

Thus, in a vehicle frontal collision, the pair of outer beads are respectively deformed so as to bend into a V-shape, and the inner bead is deformed so as to bend into a reverse V-shape, thereby improving collision energy absorbing performance of the front side frame.

CITATION LIST

Patent Literature

PLT 1: Japanese Patent Laid-Open Publication No. 2011-088597

SUMMARY OF INVENTION

Technical Problem

In the front vehicle body structure of a vehicle disclosed in Japanese Patent Laid-Open Publication No. 2011-088597, the front end part undergoes crush deformation in an axial compression direction in a vehicle frontal collision, and a collision load which is not absorbed due to the crush deformation acts on the front side frame to cause buckling deformation in a zigzag manner, so that the dash panel can be prevented from getting back.

In recent years, even further weight reduction of vehicles such as automobiles has been required for enhancing fuel economy, and it is also desirable to further reduce weight of a front side frame having a relatively large weight. Accordingly, during the course of buckling deformation, further improvement in energy absorbing performance has been desired.

It is an object of the present invention to provide a frame structure of a vehicle capable of improving collision energy absorbing performance.

Solution to Problem

A frame structure of a vehicle of a first invention according to an embodiment of the present invention comprises a side frame which constitutes a closed cross section extending in a vehicle longitudinal direction; a reinforcing member disposed in the closed cross section; and a bead portion which is formed from a plurality of ridgelines extending vertically on a side wall of the side frame and projects inwardly into the closed cross section, and the reinforcing member is joined to a front proximal portion and a rear proximal portion of the ridgeline, of planar portions on both longitudinal sides of at least one of the plurality of ridgelines.

In this frame structure, since the reinforcing member is joined to the front proximal portion and the rear proximal portion of the ridgeline, of planar portions on both longitudinal sides of at least one of the plurality of ridgelines, the strength of the reinforcing member can reduce a compressive stress and a tensile stress which act on the ridgeline, and an increase of yield strength against bending deformation of the ridgelines can enhance collision energy absorbing performance without lengthening the side frame.

According to a second invention, in the first invention, the bead portion is configured with an inner ridgeline formed inside the closed cross section; a front-side outer ridgeline formed on the front side of the inner ridgeline and outside the closed cross section from the inner ridgeline; and a rear-side outer ridgeline formed on the rear side of the inner ridgeline and outside the closed cross section from the inner ridgeline, and the reinforcing member is joined to the front proximal portion and the rear proximal portion of the inner ridgeline.

According to this configuration, a bending deformation portion of the side frame can be accurately located.

According to a third invention, in the second invention, the side wall has a front inclined planar portion which includes a line connecting a top of one end, in a vertical direction, of the inner ridgeline with a middle portion, in the vertical direction, of the front-side outer ridgeline; and a rear inclined planar portion which includes a line connecting a top of one end, in the vertical direction, of the inner ridgeline with a middle portion, in the vertical direction, of the rear-side outer ridgeline, and the reinforcing member is joined to the front and rear inclined planar portions.

According to this configuration, compressive stress and tensile stress which act on the ridgelines can be securely reduced by the strength of the reinforcing member.

According to a fourth invention, in any of the first to third inventions, the bead portion is formed in an upper-half portion or a lower-half portion of the side wall.

According to this configuration, when the vehicle height is low, the bead portion is formed in the upper-half portion of the side wall, and when the vehicle height is high, the bead portion is formed in the lower-half portion, so that the side frame can be efficiently bent and deformed.

According to a fifth invention, in the third invention, the reinforcing member has a front inclined portion and a rear inclined portion which can contact the front inclined planar portion and the rear inclined planar portion via face contact, and a coupling portion which couples a rear end portion of the front inclined portion and a front end portion of the rear inclined portion in a substantially curved shape while these ends are spaced from the inner ridgeline.

According to this configuration, bending strength of the reinforcing member can be enhanced, and thus yield strength against bending deformation of the ridgelines can further be increased.

According to a sixth invention, in any of the first to fifth inventions, the side frame has an upper wall or a lower wall, and the reinforcing member is joined at the upper wall or the lower wall near the bead portion.

According to this configuration, the reinforcing member is joined not only to the inclined planar portions of the side frame but to the upper wall or the lower wall, so that a sectional secondary moment of the side frame can be increased, and in the case where a load to bend and deform the side frame is inputted, the yield strength against bending deformation of the ridgeline can be enhanced.

Advantageous Effects of Invention

According to the present invention, regardless of the length of the side frame, yield strength against bending deformation of the ridgelines can be increased. This achieves higher collision energy absorbing performance while the degree of freedom in designing a vehicle is ensured.

DESCRIPTION OF EMBODIMENTS

The following description of the subject matter consisting of application of the invention to a front side frame of a vehicle is merely exemplary in nature and is not intended to limit the invention, its application, or its use.

Embodiment 1

An embodiment of the present invention will be described in detail below with reference to FIGS. 1 to 8.

Figure 1:
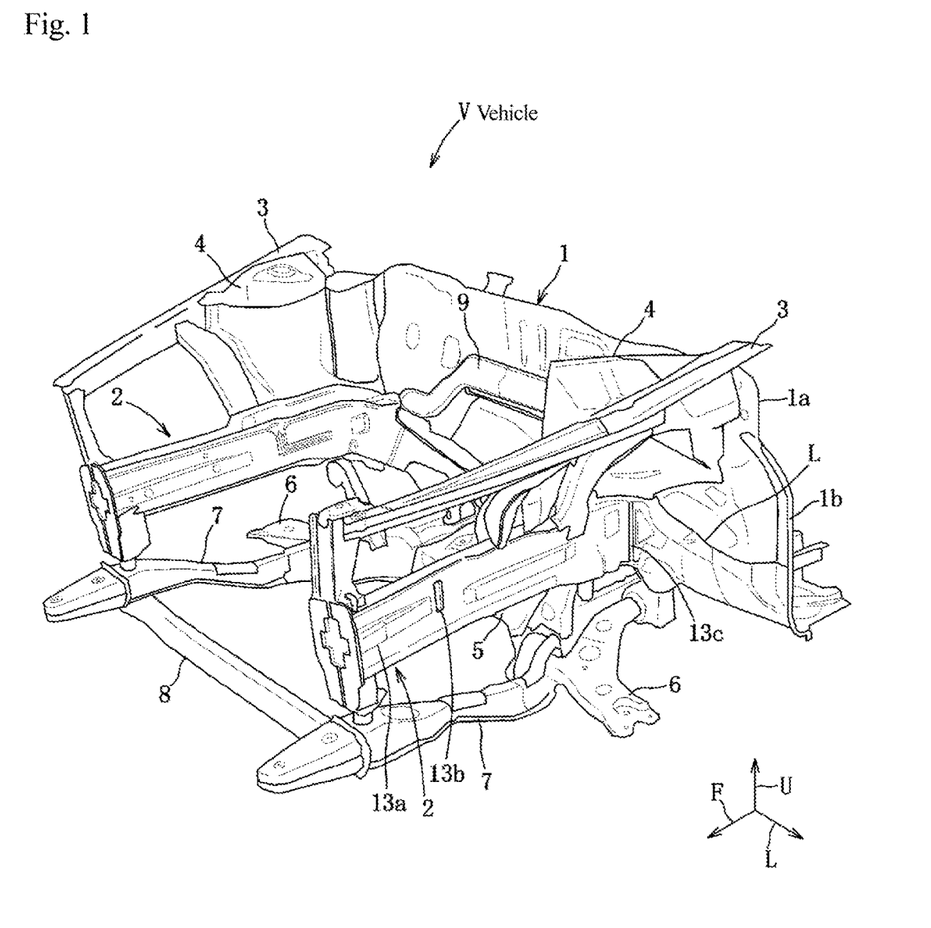
FIG. 1 is a perspective view of a front vehicle body comprising a frame structure according to Example 1 of the present invention.

As shown in FIG. 1, a vehicle V is provided with a dash panel 1 which partitions a vehicle room from an engine room in a vehicle longitudinal direction, a pair of right-and-left front side frames 2 which extend frontward from the dash panel 1, a pair of apron reinforcements 3 which are disposed outwardly in a vehicle width direction and above the pair of front side frames 2, a pair of cylindrical suspension towers 4 which are each arranged near the dash panel 1 between the front side frame 2 and the apron reinforcement 3, and the like. Herein, an arrow F denotes a vehicle front direction, an arrow L denotes a vehicle left direction, and an arrow U denotes a vehicle upward direction.

The vehicle V is further provided with a suspension cross member 5 which is disposed on a lower side of the engine room, a pair of suspension arms 6 which are arranged on both right and left sides of the suspension cross member 5, a pair of right-and-left engine support members 7 extending longitudinally, a front cross member 8 which is provided so as to extend between front ends of the pair of engine support members 7, and the like.

As shown in FIG. 1, the dash panel 1 is made of a steel plate which is thin and has a relatively low rigidity, as compared with the front side frame 2. The dash panel 1 comprises a vertical wall 1a which extends vertically at the front end portion of the vehicle room, and an inclined portion 1b which extends so as to slant downwardly toward the vehicle rear from the lower end edge of the vertical wall 1a. A lower end portion of the vertical wall 1a is joined to an upper end portion of the inclined portion 1b by spot welding. A rear end part of the inclined portion 1b is joined to a front end part of the floor panel (not illustrated). An upper end portion of the vertical wall 1a is joined to a cowl portion (not illustrated) which extends from right to left, and both right and left end portions of the dash panel 1 are joined to front hinge pillars (not illustrated).

In the joined part of the vertical wall 1a and the inclined portion 1b of the dash panel 1, a dash cross member 9 which extends from right to left and has a hat-shaped cross section is provided at a front face of the dash panel 1 on the engine room side.

The dash cross member 9 forms a closed cross section which extends from right to left, together with the dash panel 1, so that rigidity of the dash panel 1 is increased. Each of right and left end portions of the dash cross member 9 are joined to a connecting portion L of the front side frame 2 and the dash panel 1, which will be described later, so that support rigidity of the front side frame 2 is increased.

Next, the pair of right-and-left front side frames 2 will be described in detail.

As shown in FIG. 1, the pair of right-and-left front side frames 2 are disposed on the front side of the dash panel 1 which partitions the front end of the vehicle room so as to extend longitudinally at the left and right portions of the engine room. Each of these pair of front side frames 2 extends substantially horizontally from the front end position of the vehicle V toward the rear, and a midway portion at the rear end thereof is joined to the vertical wall 1a of the dash panel 1; and the rear end part is joined to the inclined portion 1b so as to extend in a rear-downward slanted state along a lower face of the floor panel. The rear end part of the front side frame 2 is joined to the dash panel 1 at the connecting portion L.

The pair of front side frames 2 have a substantially symmetrical structure between a left-side front side frame 2 and a right-side front side frame 2, so that the right-side front side frame 2 will be mainly described below.

As shown in FIGS. 1 to 4, the front side frame 2 comprises an outer panel 10 which forms a right-half portion (at the outer side in the vehicle width direction) and an inner panel 20 which forms a left-half portion (at the inner side in the vehicle width direction).

The outer panel 10 is formed in a substantially hat-shaped cross section by press-molding a steel plate. The outer panel 10 comprises an upper flange 11 which extends vertically, an upper wall 12 which extends rightward from the upper flange 11, a side wall 13 which extends downward from the right end portion of the upper wall 12, a lower wall 14 which extends leftward from the lower end of the side wall 13, and a lower flange 15 which extends downward from the left end of the lower wall 14.

As shown in FIG. 1, an outer convex portion 13a, a first outer bead portion 13b, a second outer bead portion 13c, and the like are formed in the side wall 13.

The outer convex portion 13a is provided at a middle portion, in the vertical direction, of the side wall 13 so as to extend over a range from a front end portion to a longitudinal middle part of the side wall 13. The outer convex portion 13a is formed in a rightwardly convex shape so that a projecting height of the convex part becomes smaller gradually toward the vehicle rear.

The first outer bead portion 13b is provided at a rear part of the outer convex portion 13a so as to extend vertically in the upper-half portion over a range from the upper end portion to a middle portion, in the vertical direction, of the side wall 13. The first outer bead portion 13b is configured in a substantially V-shaped lateral cross section by forming into a leftwardly convex shape.

The second outer bead portion 13c is provided in a proximal part of the dash panel 1 so as to extend vertically over a range from the upper end portion to the lower end portion of the side wall 13. The second outer bead portion 13c is configured in a substantially V-shaped lateral cross section by forming so as to project leftward.

Next, the inner panel 20 will be described in detail.

The inner panel 20 is formed in a substantially hat-shaped cross section by press-molding a steel plate. The inner panel 20 comprises an upper flange 21 which extends vertically, an upper wall 22 which extends leftward from the upper flange 21, a side wall 23 which extends downward from the left end portion of the upper wall 22, a lower wall 24 which extends rightward from the lower end of the side wall 23, and a lower flange 25 which extends downward from the right end of the lower wall 24.

Figure 2:
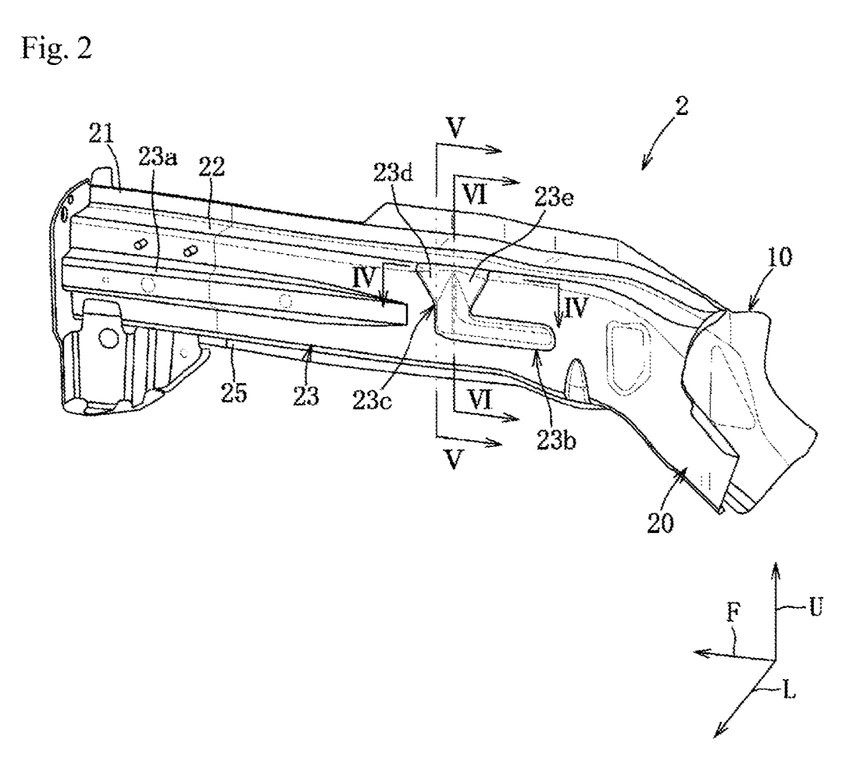
FIG. 2 is a perspective view of a right-side front side frame.
Figure 3:
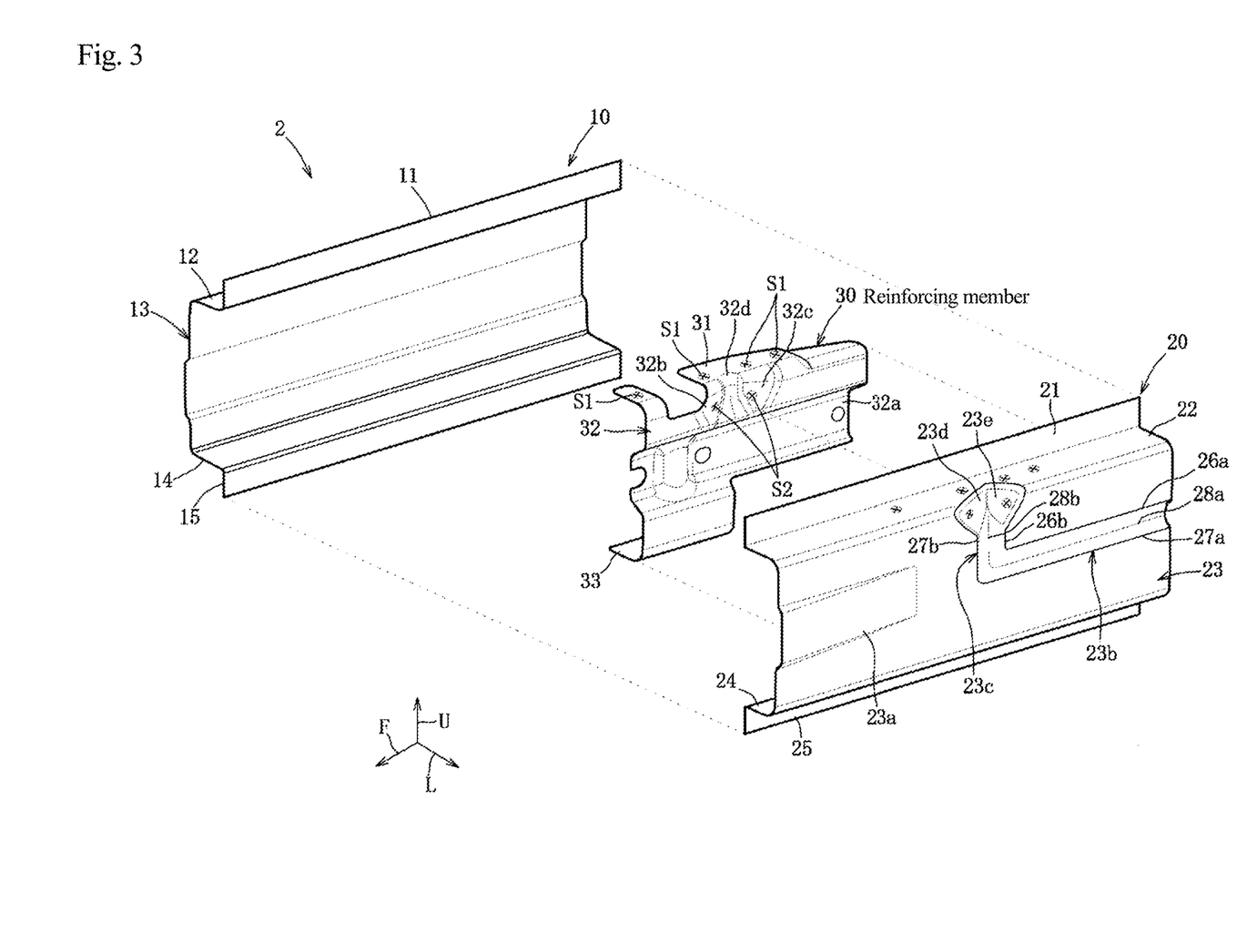
FIG. 3 is an exploded perspective view of the major portion of the right-side front side frame.
Figure 4:
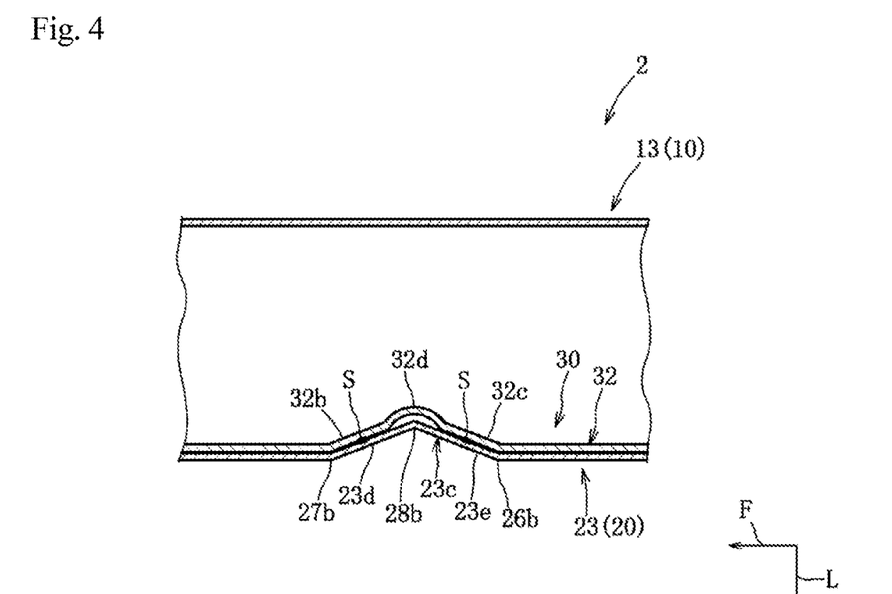
FIG. 4 is a sectional view taken along line IV-IV of FIG. 2.

As shown in FIGS. 2 to 4, an inner convex portion 23a, an inner concave portion 23b, an inner bead portion 23c, a pair of front and rear inclined planar portions 23d, 23e and the like are formed in the side wall 23.

The inner convex portion 23a is provided at a middle part, in the vertical direction, of the side wall 23 so as to extend over a range from a front end portion to a longitudinal middle portion of the side wall 23. The inner convex portion 23a is formed in a leftwardly convex shape so that a projecting height of the convex part becomes smaller gradually toward the vehicle rear.

The inner concave portion 23b is provided rearward from the inner convex portion 23a and at a middle part, in the vertical direction, of the side wall 23 so as to extend over a range from a longitudinal middle part to a rear end part of the side wall 23.

This inner concave portion 23b is configured in a substantially V-shaped vertical cross section by comprising an upper ridgeline 26a which forms an upper bent portion; a lower ridgeline 27a which is disposed in substantially parallel to the upper ridgeline 26a and forms a lower bent portion; and an intermediate ridgeline 28a which is disposed between the upper ridgeline 26a and the lower ridgeline 27a, and rightward from these ridgelines 26a, 27a.

A front end portion of the inner concave portion 23b is disposed in a position which corresponds to between the first outer bead portion 13b and the second outer bead portion 13c.

The inner bead portion 23c is provided at a rear part of the inner convex portion 23a so as to extend vertically in the upper-half portion over a range from the upper end portion of the side wall 23 to the front end portion of the inner concave portion 23b.

This inner bead portion 23c is configured in a substantially V-shaped lateral cross section by comprising a front ridgeline 27b (front-side outer ridgeline) which forms an front bent portion to connect to the front end portion of the lower ridgeline 27a; a rear ridgeline 26b (rear-side outer ridgeline) which is disposed in substantially parallel to the front ridgeline 27b, and forms a rear bent portion to connect to the front end portion of the upper ridgeline 26a; and an intermediate ridgeline 28b (inner ridgeline) which is disposed between the front ridgeline 27b and the rear ridgeline 26b and rightward from these ridgelines 26b, 27b and also connects to the front end portion of the intermediate ridgeline 28a.

The pair of inclined planar portions 23d, 23e are formed so as to be linearly symmetric with respect to the intermediate ridgeline 28b. The front inclined planar portion 23d constitutes an inclined plane which contains a line connecting between an upper end portion of the intermediate ridgeline 28b and a middle portion of the front ridgeline 27b lower than the height of the upper end portion, and which gradually shifts leftward toward the front side. The rear inclined planar portion 23e constitutes an inclined plane which contains a line connecting between the upper end portion of the intermediate ridgeline 28b and a middle portion of the rear ridgeline 26b having the same height as the middle portion of the front ridgeline 27h, and which gradually shifts leftward toward the rear side.

The front side frame 2 has the upper flanges 11, 21 and the lower flanges 15, 25 joined respectively by welding to constitute a closed cross section having a substantially rectangular cross section which extends in the vehicle longitudinal direction.

As shown in FIGS. 3 to 6, a reinforcing member 30 for enhancing yield strength of the inner bead portion 23c is disposed in the closed cross section of the front side frame 2.

The reinforcing member 30 is formed in a substantially U-shaped cross section by press-molding a steel plate.

The reinforcing member 30 comprises an upper face portion 31 which is substantially horizontal; a side face portion 32 which extends downward from a left end portion of the upper face portion 31; and a lower face portion 33 which substantially horizontally extends rightward from a lower end portion of the side face portion 32.

Figure 5:
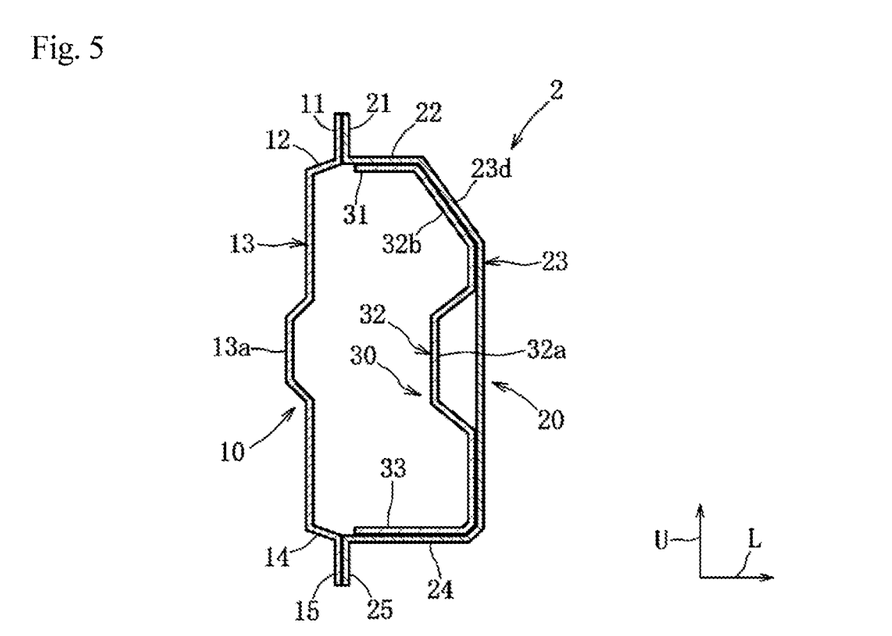
FIG. 5 is a sectional view taken along line V-V of FIG. 2.
Figure 6:
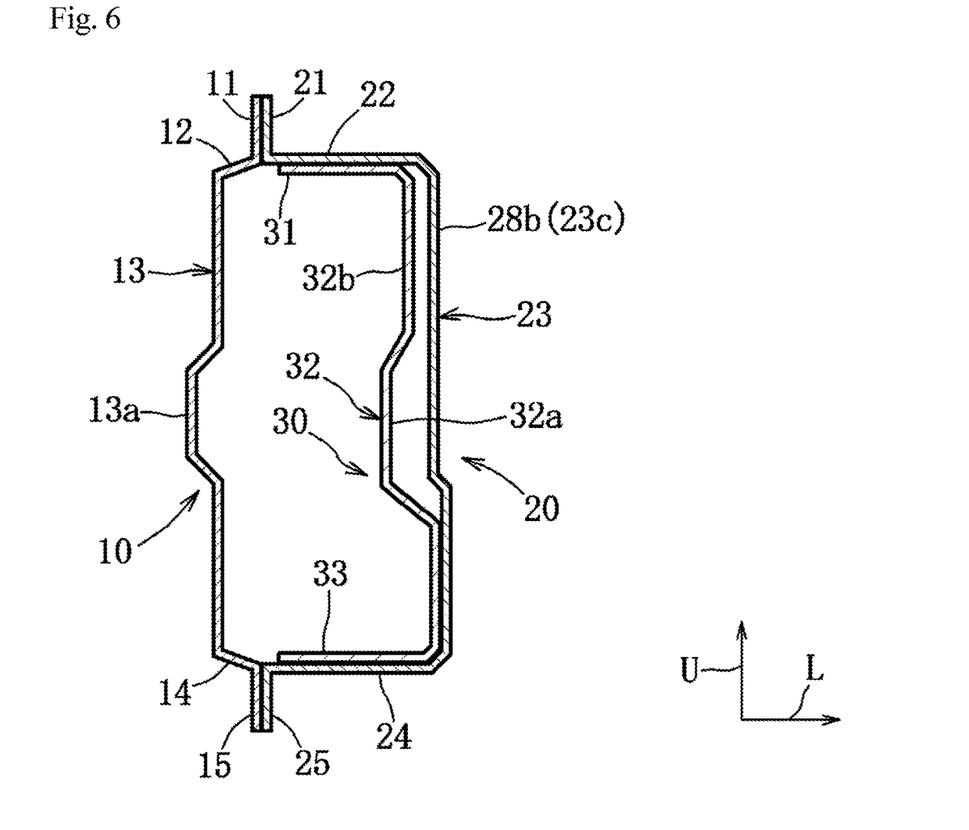
FIG. 6 is a sectional view taken along line VI-VI of FIG. 2.

As shown in FIGS. 3, 5, and 6, the upper face portion 31 is formed such that its front end part is partially notched, and the remaining portion may be firmly contact the upper wall 22 via face contact.

The lower face portion 33 is formed such that an extensive portion from its longitudinal midway portion to its rear end portion is notched and the remaining portion may be firmly contact the lower wall 24 via face contact.

As shown in FIG. 3, a plurality of first welds S1 are provided on the upper face portion 31 and the lower face portion 33, and are joined to the upper wall 22 and the lower wall 24, respectively, by welding.

As shown in FIGS. 3 to 6, the side face portion 32 comprises a concave portion 32a, a pair of front and rear inclined portions 32b, 32c, a coupling portion 32d, and the like.

The concave portion 32a is provided at a middle part, in the vertical direction, of the side face portion 32 so as to extend over a range from a front end portion to a rear end portion of the side face portion 32. The concave portion 32a is configured in a substantially U-shaped vertical cross section by forming into a rightwardly convex shape.

The pair of inclined portions 32b, 32c are configured in substantially the same shape as the pair of inclined planar portions 23d, 23e by forming so as to firmly contact the pair of inclined planar portions 23d, 23e, respectively, via face contact.

The front inclined portion 32b constitutes an inclined plane which is formed over a range from the upper end portion of the side face portion 32 to the upper end portion of the concave portion 32a and which gradually shifts leftward toward the front side. The rear inclined portion 32c constitutes an inclined plane which is formed over a range from the upper end portion of the side face portion 32 to the upper end portion of the concave portion 32a and which gradually shifts leftward toward the rear side. A second joining portion S2 given to each of the pair of inclined portions 32b, 32c is joined to each of the pair of inclined planar portions 23d, 23e by welding.

As shown in FIGS. 3, 4, and 6, the coupling portion 32d is configured such that the longitudinal length on the upper side becomes shorter in side view, and couples the rear end portion of the front inclined portion 32b and the front end portion of the rear inclined portion 32c so as to be in a substantially curved shape. This coupling portion 32d projects rightward and is thereby formed so as to be slightly spaced from the intermediate ridgeline 28b in an opposed state.

Hence, the second joining portions S2 at two positions in the vehicle longitudinal direction correspond to a front proximal portion and a rear proximal portion, respectively, of the intermediate ridgeline 28b.

Next, the action and effect of the front vehicle body structure will be described in detail.

Figure 7A:
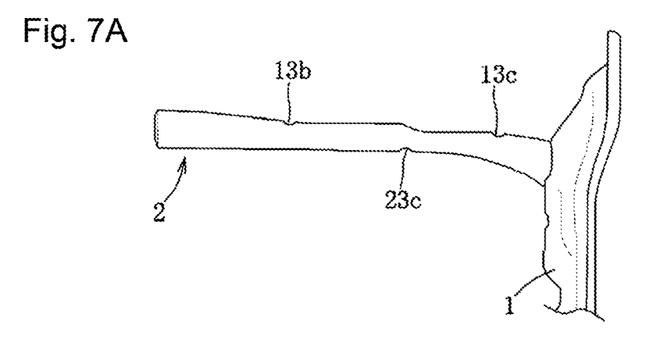
FIG. 7A is a diagram for explaining a state of the right-side front side frame before a vehicle frontal collision.
Figure 7B:
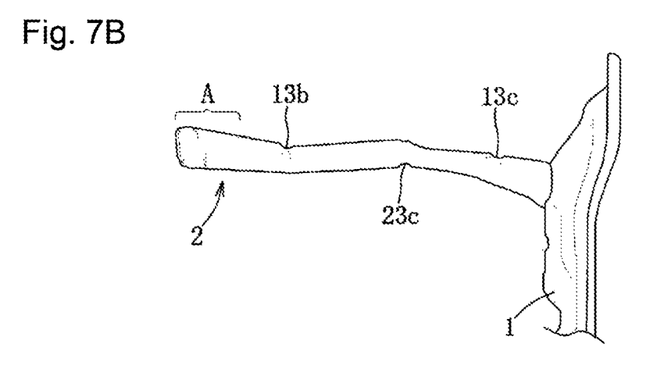
FIG. 7B is a diagram for explaining a move of the right-side front side frame at an initial stage of the vehicle frontal collision.
Figure 7C:
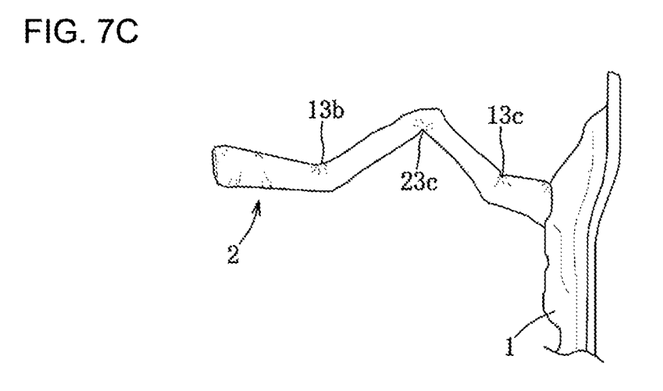
FIG. 7C is a diagram explaining a move of the right-side front side frame at a late stage of the vehicle frontal collision.

First, a deformation mode control with the front side frame 2 in a vehicle frontal collision (head-on collision) will be described with reference to FIG. 7. FIG. 7A is a diagram for explaining a state of the front side frame before a vehicle collision, FIG. 7B is a diagram for explaining a move of the front side frame at an initial stage of the vehicle collision, and FIG. 7C is a diagram explaining a move of the front side frame at a late stage of the vehicle collision. Herein, the right-side front side frame 2 is shown for convenience of the explanation.

As shown in FIG. 7A, from the vehicle front, the first outer bead portion 13b, the inner bead portion 23c, and the second outer bead portion 13c are formed at the axis of the front side frame 2 in a zigzag manner in the plan view.

When the vehicle frontal collision occurs, a crush can (not illustrated) which is provided at the front end portion of the front side frame 2 is first crushed by the collision load. The rest of the collision load which has not been absorbed through the crush of the crush can is inputted from the front end portion of the front side frame 2 and transmitted to the vehicle rear. As shown in FIG. 7B, the collision load inputted to the front end portion of the front side frame 2 causes crush deformation of an area A. Concurrently, the first outer bead portion 13b, the inner bead portion 23c, and the second outer bead portion 13c start bending.

Herein, the first outer bead portion 13b is the bead which is formed at the outer panel 10 so as to be concaved inwardly, the modulus of section of the front side frame 2 at this portion is smaller than that of other portions of the front side frame 2 which are located in front or back of this bead portion, and the rigidity of the front side frame 2 on the outer panel 10 side is greater than that on the inner panel 20 side. Consequently, the compressive stress acts on the right side part of the first outer bead portion 13b and the tensile stress acts on the left side portion thereof, thereby resulting in bending in the V shape.

The inner bead portion 23c is the bead which is formed at the inner panel 20 so as to be concaved inwardly, the modulus of section of the front side frame 2 at this portion is smaller than that of other portions of the front side frame 2 which are located in front or back of this bead portion, and the rigidity of the inner panel 20 is greater than that of the outer panel 10. Consequently, the tensile stress acts on the right side part of the inner bead portion 23c (intermediate ridgeline 28b) and the compressive stress acts on the left side part thereof, thereby resulting in bending in the reverse-V shape.

Herein, the reinforcing member 30 is joined to the inner panel 20 by the second joining portions S2 which catch the intermediate ridgeline 28b in the adjacent state, so that the compressive stress and the tensile stress which act on the intermediate ridgeline 28b are reduced by the strength of the reinforcing member 30, thereby increasing the yield strength against bending deformation of the intermediate ridgeline 28b.

The second outer bead portion 13c is a bead which is formed at the outer panel 10 so as to be concaved inwardly, the modulus of section of the front side frame 2 at this portion is small, and the rigidity of the front side frame 2 on the outer panel 10 side is greater than that on the inner panel 20 side. Consequently, the compressive stress acts on the right side part of the second outer bead portion 13c and the tensile stress acts on the left side part thereof, thereby resulting in bending in the V shape.

As the collision progresses further, as shown in FIG. 7C, the front side frame 2 bends at the respective bead portions 13b, 23c, 13c in a zigzag manner in the plan view, so that the front side frame 2 bends outwardly greatly in the vehicle width direction at the portion corresponding to the inner bead portion 23c. Thus, a large degree of collision energy can be absorbed by the zigzag bending deformation of the front side frame 2. Accordingly, the dash panel 1 can be reliably restrained from getting back, so that the proper space of the vehicle room can be ensured even in the vehicle collision.

Figure 8:
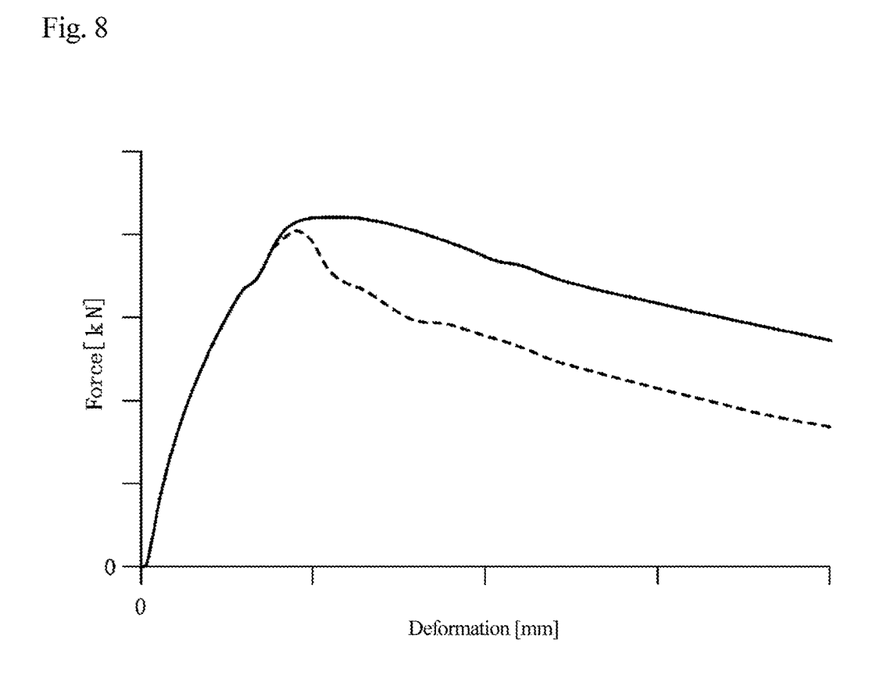
FIG. 8 is a graph showing the F-S characteristics of the inner bead portions according to Example 1 and a conventional front side frame.

FIG. 8 shows a graph of the F-S characteristics of the inner bead portion of the front side frame.

The F-S characteristics of the front side frame 2 according to this embodiment are shown by a solid line, and those of the conventional front side frame are shown in a broken line.

The conventional front side frame is obtained by which a reinforcing member having a substantially hat-shaped lateral cross section is prepared instead of the reinforcing member 30 of this embodiment, and both flange portions of the reinforcing member in the vehicle longitudinal direction are joined to the front position of the front ridgeline 27b and the rear position of the rear ridgeline 26b, respectively.

As shown in FIG. 8, a sudden load decrease occurs in the inner bead portion of the conventional front side frame when bending starts.

Meanwhile, the load on the inner bead portion according to the front side frame 2 of this embodiment at the start of bending is higher than that on the conventional one, and after the bending deformation starts, the load tends to slowly decrease.

According to the front side frame 2, since the reinforcing member 30 is joined to the front proximal portion and the rear proximal portion of the ridgeline 28b of the planar portions on both longitudinal sides of at least one of the ridgelines 26b, 27b, 28b, the strength of the reinforcing member 30 can reduce the compressive stress and the tensile stress which act on the intermediate ridgeline 28b, and the increase of the yield strength against bending deformation of the intermediate ridgeline 28b can enhance collision energy absorbing performance without lengthening the front side frame 2.

Since the inner bead portion 23c is configured with the intermediate ridgeline 28b formed inside the closed cross section, and the pair of ridgelines 26b, 27b which are formed on the front and rear sides of the intermediate ridgeline 28b and formed outside the closed cross section from the intermediate ridgeline 28b, and the reinforcing member 30 is joined to the front and rear proximal portions of the intermediate ridgeline 28b, the bending deformation portion of the front side frame 2 can be accurately located.

Since the side wall 23 has the front inclined planar portion 23d which includes a line connecting the upper end portion of the intermediate ridgeline 28b with the middle portion of the front ridgeline 27b; and the rear inclined planar portion 23e which includes a line connecting the upper end portion of the intermediate ridgeline 28b with the middle portion of the rear ridgeline 26b, and the reinforcing member 30 is joined to the front and rear inclined planar portions 23d, 23e, the compressive stress and the tensile stress which act on the intermediate ridgeline 28b can be securely reduced by the strength of the reinforcing member 30.

Since the inner bead portion 23c is formed in the upper-half portion of the side wall 23, the front side frame 2 can be efficiently bent even when the vehicle height is low.

Since the reinforcing member 30 has the front inclined portion 32b and the rear inclined portion 32c which can contact the front inclined planar portion 23d and the rear inclined planar portion 23e via face contact; and the coupling portion 32d which couples the rear end portion of the front inclined portion 32b and the front end portion of the rear inclined portion 32c in a substantially curved shape while these portions are spaced from the intermediate ridgeline 28b, the bending strength of the reinforcing member 30 can be enhanced, and thus the yield strength against bending deformation of the intermediate ridgeline 28b can further be increased.

The front side frame 2 has the upper wall 22 and the lower wall 24, and the reinforcing member 30 is joined at the upper wall 22 near the inner bead portion 23c.

Accordingly, since the reinforcing member 30 is joined not only to the inclined planar portions 23d, 23e of the front side frame 2 but to the upper wall 22, the sectional secondary moment of the front side frame 2 can be increased, and in the case where the load to bend the front side frame 2 is inputted, the yield strength against bending deformation of the intermediate ridgeline 28b can be enhanced.

Next, modifications in which the above embodiments are partially modified will be described in detail.

1) While the above embodiment describes an example applied to the collision energy absorbing mechanism of the front side frame, it may be applied to the collision energy absorbing mechanism of the rear side frame or can be applied to other frames for vehicles.

2) While the above embodiment describes an example in which the reinforcing member is provided in the bead portion of the inner panel, a reinforcing member may be provided in the bead portion of the outer panel to enhance the yield strength of the bead portion of the outer panel.

3) The above embodiment describes an example in which the reinforcing member is joined to the front and rear proximal positions of the intermediate ridgeline. In addition to the above, however, the reinforcing member may be joined to the front proximal position and the rear proximal position of the front ridgeline and the rear ridgeline, respectively, to further enhance the yield strength of the inner bead portion.

Moreover, while the above embodiment describes an example of the bead portion comprising the front ridgeline, the rear ridgeline, and the intermediate ridgeline, the bead portion comprising the front ridgeline, the rear ridgeline, and a curved portion which is joined to these ridgelines may be applied.

In this case, the reinforcing member is joined to the front proximal position and the rear proximal position of at least one of the front ridgeline and the rear ridgeline.

4) While the above embodiment describes an example in which the inner bead portion is formed in the upper-half portion of the front side frame, the bead portion may be formed in the lower-half portion. Thus, the front side frame 2 can be efficiently bent even when the vehicle height is high.

5) It is possible for those skilled in the art to make modifications and variations of the above embodiments without departing from the spirit and scope of the invention, and the invention also comprises those modifications and variations.

LIST OF REFERENCE CHARACTERS

V vehicle
S2 second joining portion
2 front side frame
23 side wall
23c inner bead portion
23d front inclined planar portion
23e rear inclined planar portion
26b rear ridgeline
27b front ridgeline
28b intermediate ridgeline
30 reinforcing member
32b front inclined portion
32c rear inclined portion
32d coupling portion

The invention claimed is:
1. A frame structure of a vehicle comprising:
a side frame which constitutes a closed cross section extending in a vehicle longitudinal direction;
a reinforcing member disposed in the closed cross section; and
a bead portion which is formed from a plurality of ridgelines extending vertically on a side wall of the side frame and projects inwardly into the closed cross section, the plurality of ridgelines comprising:
an inner ridgeline formed inside the closed cross section;
a front-side outer ridgeline formed on a front side of the inner ridgeline and outside the closed cross section from the inner ridgeline; and a rear-side outer ridgeline formed on a rear side of the inner ridgeline and outside the closed cross section from the inner ridgeline,
wherein the reinforcing member is joined to a front inclined planar portion located on the front side of the inner ridgeline and a rear inclined planar portion located on the rear side of the inner ridgeline.

2. The frame structure of the vehicle according to claim 1, wherein the side wall has the front inclined planar portion which includes a line connecting a top of one end, in a vertical direction, of the inner ridgeline with a middle portion, in the vertical direction, of the front-side outer ridgeline; and the rear inclined planar portion which includes a line connecting a top of one end, in the vertical direction, of the inner ridgeline with a middle portion, in the vertical direction, of the rear-side outer ridgeline.

3. The frame structure of the vehicle according to claim 1, wherein the bead portion is formed in an upper-half portion or a lower-half portion of the side wall.

4. The frame structure of the vehicle according to claim 2, wherein the reinforcing member has a front inclined portion and a rear inclined portion which can contact the front inclined planar portion and the rear inclined planar portion via face contact, and a coupling portion which couples a rear end portion of the front inclined portion and a front end portion of the rear inclined portion in a substantially curved shape while these ends are spaced from the inner ridgeline.

5. The frame structure of the vehicle according to claim 1, wherein the side frame has an upper wall or a lower wall, and
wherein the reinforcing member is joined at the upper wall or the lower wall near the bead portion.

\* \* \* \* \*